(12) United States Patent
Olarig

(10) Patent No.: US 6,804,736 B2
(45) Date of Patent: Oct. 12, 2004

(54) BUS ACCESS ARBITRATION BASED ON WORKLOAD

(75) Inventor: Sompong P. Olarig, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 524 days.

(21) Appl. No.: 09/727,032

(22) Filed: Nov. 30, 2000

(65) Prior Publication Data

US 2002/0099892 A1 Jul. 25, 2002

(51) Int. Cl.[7] ............................................. G06F 13/38
(52) U.S. Cl. ...................... 710/240; 710/112; 710/113; 710/116; 710/305; 710/306; 710/309; 710/310; 710/107; 710/241; 710/52; 710/57
(58) Field of Search ........................... 710/240, 52, 57, 710/112, 113, 116, 305, 306, 309, 310, 107, 241, 262, 8; 712/214; 709/234; 370/523; 711/133; 718/105

(56) References Cited

U.S. PATENT DOCUMENTS

| | | | | |
|---|---|---|---|---|
| 5,440,691 A | * | 8/1995 | Carrafiello et al. | 709/234 |
| 5,448,701 A | * | 9/1995 | Metz et al. | 710/113 |
| 5,506,967 A | * | 4/1996 | Barajas et al. | 711/118 |
| 5,546,543 A | * | 8/1996 | Yang et al. | 709/235 |
| 5,630,077 A | * | 5/1997 | Krein et al. | 710/113 |
| 5,634,073 A | | 5/1997 | Collins et al. | 395/825 |
| 5,692,149 A | * | 11/1997 | Lee | 711/133 |
| 5,771,359 A | * | 6/1998 | Galloway et al. | 710/310 |
| 5,867,728 A | * | 2/1999 | Melo et al. | 710/8 |
| 5,907,689 A | | 5/1999 | Tavallaei et al. | 395/290 |
| 6,009,106 A | * | 12/1999 | Rustad et al. | 370/523 |
| 6,182,176 B1 | | 1/2001 | Ziegler et al. | 710/112 |
| 6,189,065 B1 | * | 2/2001 | Arndt et al. | 710/260 |
| 6,202,080 B1 | * | 3/2001 | Lu et al. | 718/105 |
| 6,249,830 B1 | * | 6/2001 | Mayer et al. | 710/113 |
| 6,304,932 B1 | * | 10/2001 | Ziegler et al. | 710/112 |
| 6,338,133 B1 | * | 1/2002 | Schroter | 712/214 |
| 6,460,133 B1 | * | 10/2002 | Nunez et al. | 712/214 |
| 6,584,530 B2 | * | 6/2003 | Kondo et al. | 710/240 |
| 6,697,904 B1 | * | 2/2004 | Bennett | 710/309 |

OTHER PUBLICATIONS

W.J. Bainbridge and S.B. Furber, "Asynchronous Macrocell Interconnect Using MARBLE", Apr. 1998, Advanced Research in Asynchronous Circuits and Systems, 1998.*
James L. Peterson, Abraham Silberschatz, "Operating System Concepts", Addison Westley, 1985, 2nd ed., pp 121–125.*
ANSI Definition for "Computer system", Cadrei Inc., http://www.cadreinc.com/Medical/Reference–Guide/20–Organizations/21–FDA/A–Glossary/GLOSSARY–OF–COMPUTERIZED–SYSTEM–AND SOFTWARE.html.*
Webopedia, the definition for "bus", http://www.webopedia.com/TERM/b/bus.html.*
James L. Peterson, Abraham Silberschatz, "Operating System Concepts", Addison Westley, 1985, 2nd ed., p. 121.*

* cited by examiner

Primary Examiner—Xuan M. Thai
Assistant Examiner—Justin I. King

(57) ABSTRACT

A computer system with a bus arbitration system adaptively assigns priority to devices on the bus based upon workload. A bus arbiter receives request signals from bus devices that require bus access, and also receives a signal indicating the pending workload of that device, as measured by the number of operations pending in a queue in that device. Based on the workload signal, the bus arbiter breaks any arbitration conflicts by assigning priority to the device with the greatest workload. In the event of ties, the bus arbiter may use other arbitration schemes to break ties between devices with equal workloads.

16 Claims, 3 Drawing Sheets

BUS ACCESS ARBITRATION BASED ON WORKLOAD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The present invention generally relates to the orderly and efficient transfer of data and instructions on computer bus systems. More particularly, the present invention relates to an arbitration system that enables bus devices that have the greatest need to access the bus. Still more particularly, the present invention relates to a bus arbitration system that adaptively grants priority to devices on the bus based on the workload of the devices.

Background of the Invention

A personal computer system includes a number of components with specialized functions that cooperatively interact to enable the computer system to perform a variety of tasks. The ability of these various components to exchange data and other signals is vital to the successful operation of a computer system. Typically, components interact by reading or writing data or instructions to other components in the system.

Early computer systems typically included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Traditionally, the CPU controlled most activities in the computer system. The CPU supervises data flow and is responsible for most of the high-level data modification in the computer. The CPU, therefore, is the "heart" of the system and receives signals from the peripheral devices, reads and writes data to memory, processes data, and generates signals controlling the peripheral devices.

Despite the importance of the processor, the performance of the computer system is determined only in part by the speed and efficiency of the processor. Other factors also affect system performance. One of the most critical factors is the bus that interconnects the various system components. The size and clock speed of the bus dictate the maximum amount of data that can be transmitted between components. Early bus systems, such as the ISA (Industry Standard Architecture) bus, required that all components communicate through the CPU. The ISA bus, as the name implies, was a bus standard adopted by computer manufacturers to permit the manufacturers of peripheral devices to design devices that would be compatible with most computer systems.

Since the introduction of the ISA bus, computer technology has continued to evolve at a relatively rapid pace. New peripheral devices have been developed, and processor speeds and the size of memory arrays have increased dramatically. In conjunction with these advances, designers have sought to increase the ability of the various system busses to transfer more data at a faster speed. One way in which the system busses have been made more efficient is to permit data to be exchanged in a computer system without the assistance of the CPU. To implement this design, however, a new bus protocol had to be developed. One of the first such buses that permitted peripheral devices to run master cycles independently of the CPU was the EISA (Extended Industry Standard Architecture) bus. The EISA bus enables various system components residing on the EISA bus to obtain mastership of the bus and to run cycles on the bus.

More recently, the Peripheral Component Interconnect (PCI) bus has become increasingly popular. Like the EISA bus, the PCI bus has bus master capabilities, and thus certain master components residing on the PCI bus may communicate directly with other PCI components by addressing read and write commands to these other components based on protocols defined in the PCI Specification, which has been jointly developed by companies in the computer industry. Because of the bus mastering capabilities and other advantages of the PCI bus, many computer manufacturers now implement the PCI bus as one of the primary expansion busses in the computer system.

FIG. 1 shows a representative prior art computer system that includes a CPU 20 coupled to a bridge logic device 25 via a CPU bus 23. The bridge logic device 25 is sometimes referred to as a "North bridge" for no other reason than it often is depicted at the upper end of a computer system drawing. The North bridge 25 also couples to the main memory array 35 by a memory bus 30. The North bridge 25 couples the CPU 20 and memory 35 to the peripheral devices 42, 44 in the system through a PCI bus 45 or other expansion bus. Various components that understand PCI protocol may reside on the PCI bus such as PCI bus devices 42, 44. PCI devices may comprise any of a number of different peripheral devices including video accelerators, audio cards, hard or floppy disk drives, Small Computer Systems Interface (SCSI) adapters and the like.

If other secondary expansion busses 47, 51 are provided in the computer system, another bridge logic device 40 typically is used to couple the system bus 45 to those expansion busses. This bridge logic device 40 is sometimes referred to as a "South bridge" reflecting its location vis-a-vis the North bridge in a typical computer system drawing. An example of such bridge logic is described in U.S. Pat. No. 5,634,073, assigned to Compaq Computer Corporation. In FIG. 1, the South bridge 40 couples the PCI bus 45 to an ISA bus 49 and a USB bus 51. Various ISA-compatible devices 49 may be coupled to the ISA bus 47. As one skilled in the art will understand, devices residing on the ISA bus 47 or USB bus 51 may be targets for devices coupled to the PCI bus 45, including the CPU 20. Thus, even though the CPU 20 is not directly connected to the ISA bus 47, it may still need to read and write data, or perform other operations, to devices on that bus. The PCI protocol permits devices residing on the PCI bus to run master cycles to targets on the PCI bus. To permit devices on other busses to run master cycles on the PCI bus, the South bridge 40 operates as a master device on the PCI bus 45 to execute transactions that actually originate on the secondary expansion bus, such as the ISA bus 49.

Because there may be numerous master devices residing on expansion busses, such as the PCI bus, typically a bus arbiter 27 is provided in the computer system. When multiple devices seek to access the bus at the same time, the bus arbiter 27 determines which of these devices will be granted the right to run cycles on the bus. Thus, the bus arbiter receives request (REQ) signals from devices on the bus, and issues a grant (GNT) signal to a particular device based on a predetermined priority scheme, indicating that the recipient of the grant signal may run a cycle on the PCI bus 45. Two priority schemes are commonly used in the bus arbiter 27. The first scheme is to assign a predetermined priority level to each device on the bus, so that when two devices issue a request to run a cycle on the bus simultaneously, the bus arbiter assigns grants access to the bus based on the pre-assigned level. A second common scheme is to award priority on a round-robin basis, where the bus arbiter 27 essentially takes turn awarding priority to each device. The problem with these arbitration schemes is that they fail to consider other events that may impact efficiency of the bus. In particular, these arbitration schemes may cause a bus device to be "starved" by not obtaining sufficient access to run requisite bus cycles. Other schemes have also been proposed over the years in an attempt to increase the efficiency of bus transfers. See for example U.S. Pat. No. 5,907,689, entitled "Master-Target Based Arbitration Priority," assigned to the assignee of the present invention. One common problem with existing prior bus arbitration designs is that they fail to consider the workload of the devices on the bus. As a result, a device that has a large workload may be unable to obtain access to the bus to complete operations that are awaiting execution.

It would be desirable is a bus arbitration system was available that would consider the workload of devices when awarding access to a bus. Despite the apparent advantages such a system would offer, to date no such system has been made available.

BRIEF SUMMARY OF THE INVENTION

The present invention solves the deficiencies of the prior art by implementing an adaptive bus arbiter that monitors the workload of devices that are requesting access to a bus. According to the preferred embodiment, the bus arbiter receives request signals from devices on the bus seeking to run cycles on that bus. In addition, the bus arbiter also receives a signal from each requesting device indicating the workload of that device. In accordance with the preferred embodiment, each of the bus devices includes a queue in which operations that are awaiting execution are stored. The workload of a particular device preferably is based on the number of operations that are in that queue's device, awaiting execution. Each device thus sends a signal to the bus arbiter indicating the number of operations that are awaiting execution in its queue. The workload signal may comprise a multi-bit signal to indicate the exact number of pending operations (for example, there are four operations pending in the queue), or may use ranges (for example, there are three or more operations pending in the queue).

In response to receipt of a request signal and a workload signal, the bus arbiter determines priority among conflicting bus requests by considering the workload of each device seeking to run a bus cycle. According to the preferred embodiment, the bus arbiter grants priority to the device that has the most operations pending in its queue, or if two devices have the same number or range of entries, based on a combination of pending entries and other factors. In one exemplary embodiment, the bus arbiter permits the bus device that is awarded priority to execute all pending operations in its queue. According to an alternative embodiment, the bus arbiter re-determines priority on a cycle-by-cycle basis.

These and other details regarding the present invention will become apparent to one skilled in the art, upon analyzing the following detailed description of the preferred embodiment, drawings and claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
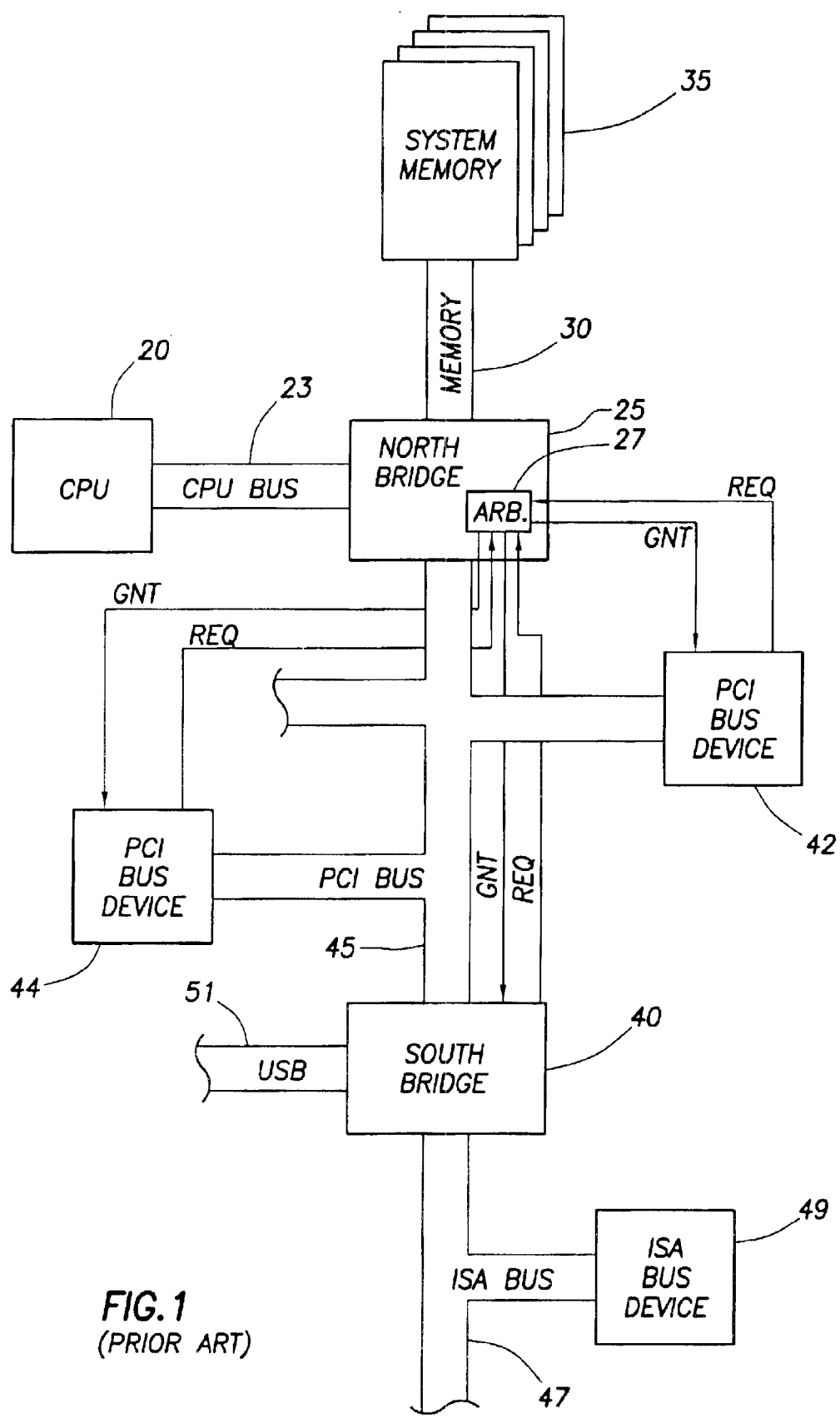
FIG. 1 is a block diagram of a conventional prior art computer system architecture.

In the following description, a bus arbitration system is described generically, with the understanding that this arbitration system may be used with any bus system in which multiple devices may request access to a bus simultaneously. Thus, the bus arbitration system may be used in any system in which master and/or target devices must ask permission prior to running a cycle on the bus, or responding to a cycle on the bus. The bus arbitration system may be used with the conventional PC architecture shown in FIG. 1, or with any other computer architecture, including multi-processor computer systems. According to the preferred embodiment, the bus arbiter of the present invention preferably resides in a North bridge, memory controller, or an I/O controller hub, and operates to arbitrate mastership of the PCI bus. It should be understood, however, that the bus arbiter may be located elsewhere in the computer system, including in any device or bridge connected to the bus which is being controlled. It should also be understood that the bus arbitration system is not limited to controlling accesses to the PCI bus, but may be used with any bus that requires arbitration logic.

Figure 2:
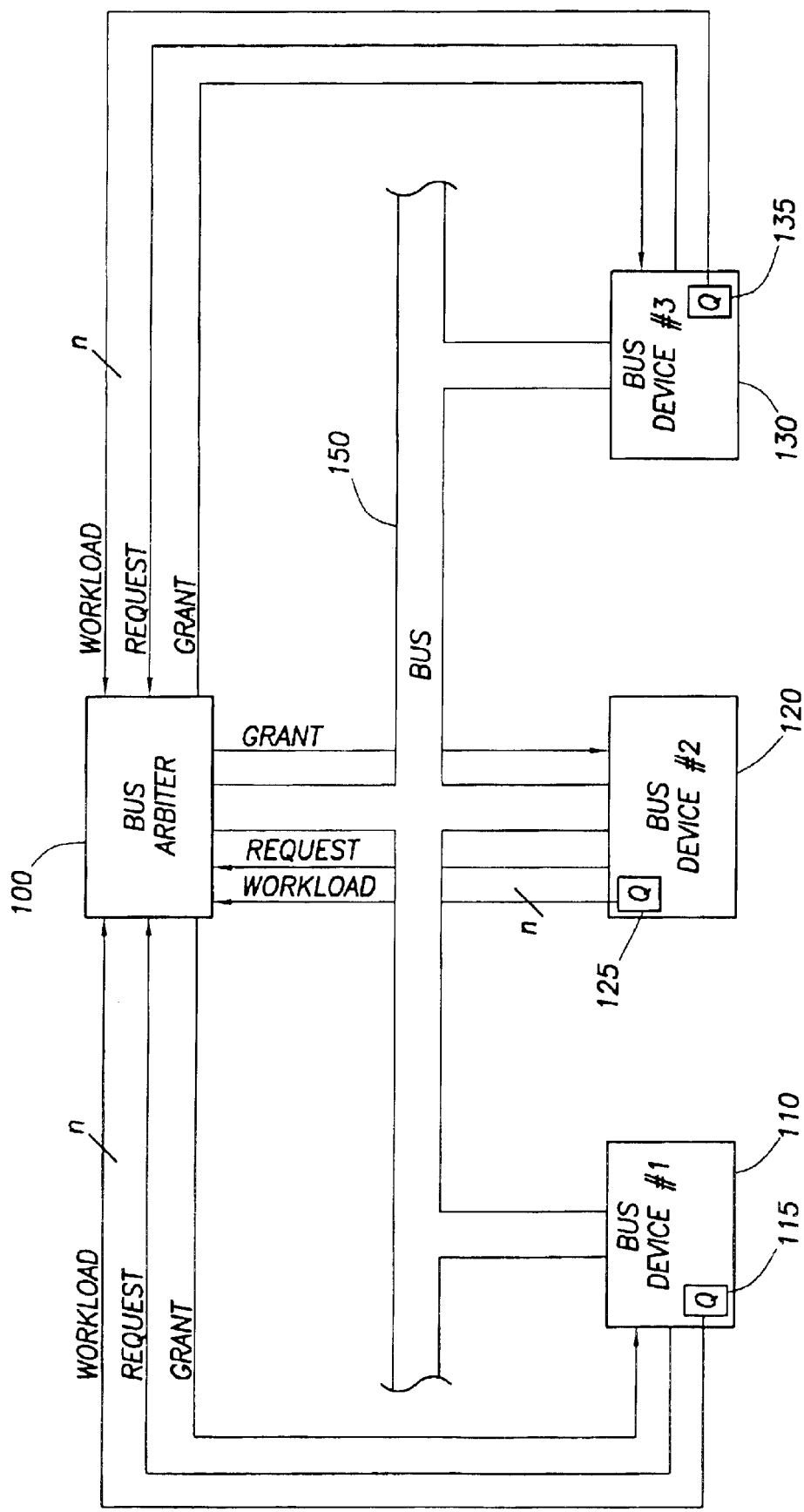
FIG. 2 is a block diagram of a bus arbitration system constructed in accordance with the preferred embodiment of the present invention.

Referring now to FIG. 2, in accordance with the preferred embodiment a bus arbitration system includes a bus arbiter 100, and a plurality of bus devices that couple to a system bus 150. Three such bus devices 110, 120, 130 are shown in the example of FIG. 2. As noted above, the bus arbiter 100 may be located in any device coupled to bus 150, including for example, a North bridge device, a South bridge device, a memory controller, a I/O controller hub, or any other device that may arbitrate for mastership of the bus 150. Alternatively, the bus arbiter 100 may comprise a stand-alone device that couples separately to bus 150 and solely functions as a bus arbitration unit.

In the preferred embodiment, each of the bus devices 110, 120, 130 comprise devices that are capable of running master cycles on bus 150. Other devices that operate solely as slaves on bus 150 are omitted so as not to unduly complicate FIG. 2. It should be understood that bus devices 110, 120, 130 (and, for that matter, bus arbiter 100) may also operate as slave devices, and thus be targets of master cycles on bus 150. The bus devices 110, 120, 130 may include any of a variety of peripheral devices such as, for example, video accelerators, audio cards, hard or floppy disk drives, Small Computer Systems Interface (SCSI) adapters and the like, or may comprise a South bridge device or I/O controller hub.

As an alternative to the system described above in which bus devices 110, 120, 130 comprise master devices, the present invention may also be implemented with one or more of these devices comprising slave devices. Thus, the present invention may be used in systems that require slave devices to arbitrate for access to the bus when responding to a master cycle, as well as in systems in which it is the responsibility of the master device to maintain control of the bus for a sufficient time to allow slaves to respond.

The bus 150 preferably comprises a high performance bus system that includes bus mastership capabilities, such as, for example, the PCI bus. Bus 150 may comprise any of various other busses that presently exist, or which may become available in the future, that have multiple masters that must arbitrate for mastership of the bus.

Referring still to FIG. 2, each of the bus devices preferably includes a queue, in which operations are stored while the device awaits access to the bus. Thus, bus device 110 includes a queue 115; bus device 120 includes a queue 125; and bus device 130 includes queue 135. The sizes of these queues are arbitrary, but preferably each queue is capable of storing at least two entries, and more preferably is capable of storing at least four entries. Thus, each of the queues 115, 125, 135 are capable of storing multiple entries which can be executed once the associated bus device obtains a right to access the bus 150.

As shown in FIG. 2, each of the bus devices 110, 120, 130 preferably connect electrically to the bus 150. According to the preferred embodiment, the bus devices 110, 120, 130 also transmit a grant request (REQUEST) signal and a workload (WORKLOAD) signal to the bus arbiter 100, and receive a grant (GRANT) signal from the bus arbiter 100. Although shown separately for purposes of illustration, any one or all of these signals may comprise part of the bus 150. Alternatively, any one or all of these signals may comprise a separate sideband signal connected individually between each bus device 110, 120, 130 and the bus arbiter 100.

In accordance with standard convention, the request signal is transmitted by any bus device whenever that bus device is ready to access the bus. Thus, according to the present invention, any of bus devices 110, 120, 130 transmit a request (REQUEST) signal to the bus arbiter 100 when one or more entries is pending in the associated queue 115, 125, 135. Similarly in accordance with normal convention, the bus arbiter issues a grant signal to one of the bus devices to indicate that the requesting device has been granted mastership of the bus. Thus, as shown in FIG. 2. bus arbiter 100 transmits a (GRANT) signal to one of the bus devices 110, 120, 130 indicating that one of the bus devices has been granted mastership of bus 150.

Referring still to FIG. 2, and in accordance with the preferred embodiment of the present invention, each of the bus devices 110, 120, 130 also transmits a workload (WORKLOAD) signal to the bus arbiter 100. The WORKLOAD signal indicates the number or range of operations that are pending in the queue of each of the bus devices that are requesting access to the bus 150. Thus, if bus device 110 requests access to the bus 150, it transmits a REQUEST signal and a WORKLOAD signal to the bus arbiter 100. As shown in FIG. 2, the WORKLOAD signal may comprise a multi-bit signal transmitted on a number of bus lines n to indicate the number of entries pending in the queue. Alternatively, the WORKLOAD signal may comprise a multi-bit signal that is transmitted serially, or in packets. According to the preferred embodiment, the number of bits n is determined by the number of entries that can be stored in the queue, according to the formula $2^n$=number of queue entries. Thus, if each of the queues is capable of holding four entries, then 2 bits are used to the WORKLOAD signal, which preferably is sent in parallel, but may be sent serially. In the event that each queue is presumed to be capable of holding four entries, Table I may be used to encode the WORKLOAD signal based on the number of entries pending in the queue.

TABLE I

| Number of entries in queue | WORKLOAD signal |
|---|---|
| 1 | 00 |
| 2 | 01 |
| 3 | 10 |
| 4 | 11 |

As one skilled in the art will understand, no entry is needed for zero entries in the queue, because in that event the WORKLOAD signal is a don't care condition and no REQUEST signal will be asserted. Various other encoding schemes may be used, and fewer or more bits may be used to indicate queues of different sizes. Thus, queues that can only hold two entries may be encoded with one bit, while queues that may hold 5, 6, 7 or 8 entries may be encoded using three bits, as follows:

TABLE II

| Number of entries in queue | WORKLOAD signal |
|---|---|
| 1 | 000 |
| 2 | 001 |
| 3 | 010 |
| 4 | 011 |
| 5 | 100 |
| 6 | 101 |
| 7 | 110 |
| 8 | 111 |

Instead of using discrete values, ranges also may be used. Thus, for example, a value of 11 for the WORKLOAD signal may be used to indicate 4 or more entries are pending in the queue. This technique may be used to minimize the number of bits required to indicate the number of entries pending in the queue. Furthermore, it will be appreciated that queues of different sizes may be used in the bus devices with a coding scheme that represents the number of entries, or range of entries, that are available in each queue.

Thus, as a first example in which each of the bus devices 110, 120, 130 have queues 115, 125, 135 that are four or more entries deep, consider that bus devices 110, 120, 130 all submit a bus request substantially simultaneously, and bus device 110 has one entry in the queue 115, bus device 120 has two entries in queue 125, and bus device 130 has four entries in queue 135. In that event, each of the bus devices 110, 120, 130 will transmit a REQUEST signal substantially simultaneously to bus arbiter 100. In addition, each of the bus devices 110, 120, 130 also will transmit a WORKLOAD signal, indicating the number of operations pending in the queue. Thus, because each of the devices in this example have a different number of operations pending in the associated queue, each bus device will transmit a WORKLOAD signal with a different value. In this example, bus device 110 may assert two logic level low signals (a 00) on the two bus device 120 asserts a 01, and bus device 130 asserts a 11 on the two signal lines. From this the bus arbiter 100 preferably selects bus device 130 because that device has the greatest workload.

As a second example, assume bus device 110 has a 4 entry queue with four entries pending, bus device 120 has a 8 entry queue with two entries pending, and bus device 130 has a 8 entry queue with four entries pending, and all bus devices substantially simultaneously request mastership of the bus. In this example, bus device 110 will assert a WORKLOAD signal of 11 (or if three bits are used for the WORKLOAD signal, of 011), bus device 120 will assert a WORKLOAD signal of 001 (or 01 if only two bits are used for the WORKLOAD signal), and bus device 130 will assert a WORKLOAD signal of 011 (or 11 if only two bits are used for the WORKLOAD signal, to indicate four or more). In response, the bus arbiter will determine that bus device 110 and bus device 130 have the same priority level. At that point, the bus arbiter 100 will preferably use some other arbitration logic to break this tie. That logic may involve a round-robin approach to break the tie by awarding priority to the device 100 or 130 which has gone the longest without being granted a bus access. Alternatively, the bus arbiter may break any ties by using a predetermined priority assignment for each device. Various other tie-breaking schemes may be used, as will be apparent to one of ordinary skill in the art.

Figure 3:
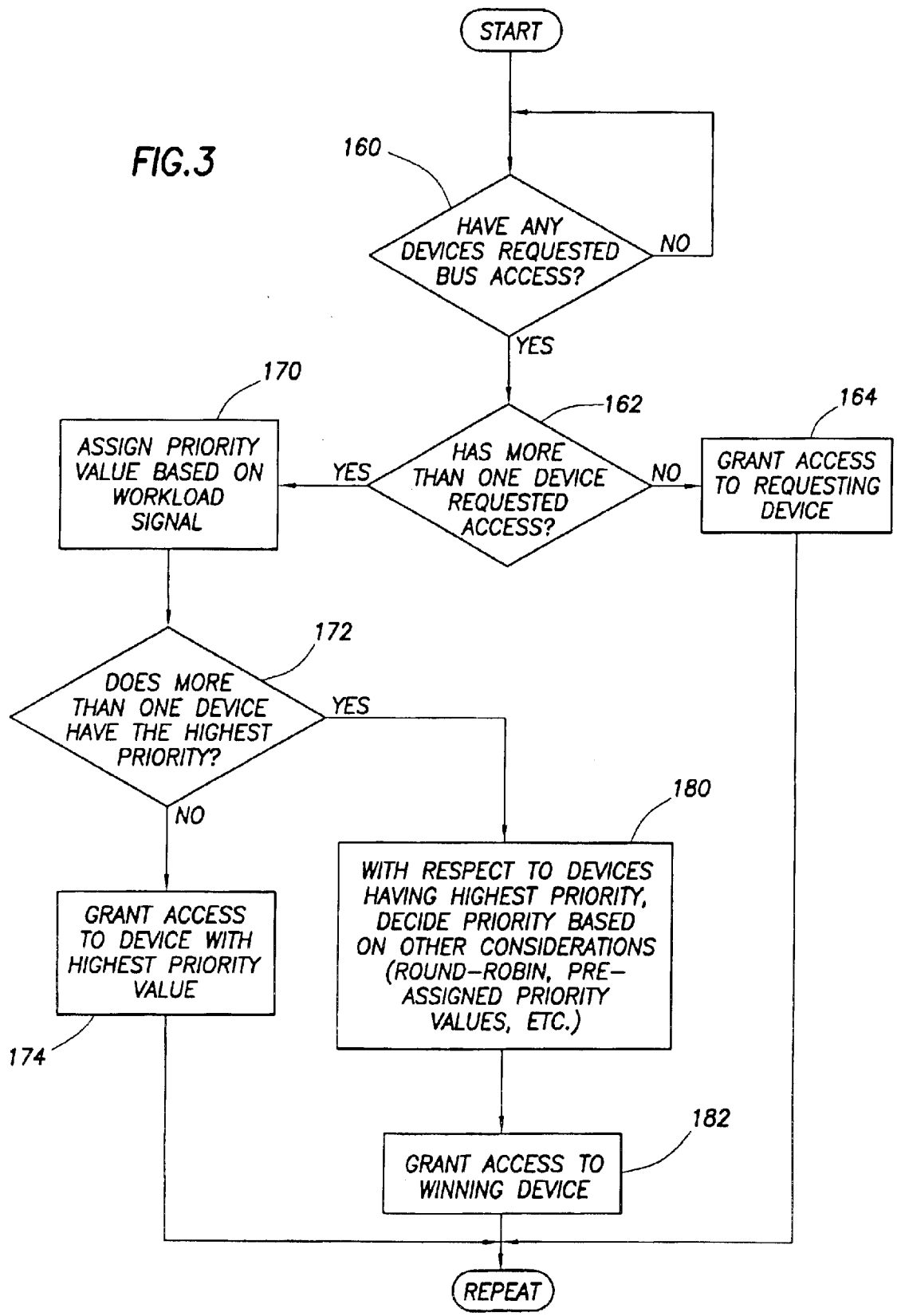
FIG. 3 is a block diagram of exemplary flow logic for the bus arbiter of FIG. 2.

Referring now to FIG. 3, an exemplary flow logic for implementing the bus arbiter 100 is shown, with the understanding that other operational schemes or algorithms may be readily developed for implementing a bus arbiter in accordance with the principles of the present invention. The flow logic depicted in FIG. 3 preferably is designed to run periodically on the bus arbiter, or on any other suitable processor in the computer system, with the period determined by the system designer. As one skilled in the art will understand, the flow logic of FIG. 3 may be implemented as a state machine, firmware, or as a separately executing program.

When the flow logic is initiated, the bus arbiter determines in step 160 if any devices have requested access to the bus. If no device is currently seeking access to the bus, then step 160 repeats until a device requests access, or "parks" the bus at the last bus master device. Once a bus access request is received by the bus arbiter, the bus arbiter determines in step 162 if more than one device has requested access to the bus by asserting the REQUEST signal. If not, the bus arbiter grants access to the sole requesting device in step 164. If conversely, more than one device has requested bus access, then the bus arbiter assigns a priority value to each device requesting access based on the value of the WORKLOAD signal, as indicated in step 170. Thus, in step 170, the bus arbiter analyzes the WORKLOAD signal from each device asserting the REQUEST signal, and determines which device has the greatest value for the WORKLOAD signal. If only one device has the greatest workload value, then the bus arbiter grants access to that device, as indicated in step 174. If two or more devices tie, as shown in step 172, the bus arbiter breaks the tie based on other considerations, such as determining which device has had the longest period of no access, pre-assigned priority values, or any other criteria that may be useful in deciding priority in a bus arbitration scheme. In step 182, the device that wins is awarded access the bus.

The above flow logic may be used in two different ways. First, the flow logic may be used so that each bus access requires a determination regarding priority. Thus, each device is only entitled to run a single cycle when awarded bus access, and then must again arbitrate for a subsequent access. As an alternative to this technique, the flow logic may be modified so that whichever device is given access is permitted to execute all queued operations.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
    an internal computer bus coupling together a plurality of bus devices, wherein each of said plurality of bus devices includes a queue in which pending operations awaiting execution onto the bus are stored while the bus device awaits access to the computer bus;
    a bus arbiter coupled to the computer bus, said bus arbiter receiving requests from said plurality of bus devices to obtain access to the computer bus and wherein each of said bus devices transmits a signal to said bus arbiter indicating a number of operations pending in the queue of the bus device;
    wherein said bus arbiter resolves conflicting requests from said bus devices based on the number of operations pending in the queue of the bus devices requesting bus access.

2. The system of claim 1, wherein said bus arbiter compares the signals indicating the number of operations pending in the queue from any bus devices requesting access to the computer bus, and awards access to the bus device with the most operations pending in its associated queue.

3. The system of claim 2, wherein said bus arbiter breaks any ties between bus devices with an equal number of operations pending in the queue based on a predetermined priority value assigned to each bus device.

4. The system of claim 2, wherein said bus arbiter breaks any ties between bus devices with an equal number of operations pending in the queue based on which device was last granted access.

5. The system of claim 2, wherein the signal indicating the number of operations pending in the queue comprises a multi-bit signal.

6. The system of claim 5, wherein the multi-bit signal comprises n bits, with $2^n$=number of entries in the queue of each device.

7. The system of claim 1, wherein the bus device access request indicates the number of operations pending in the queue of the bus device through a combination of specific numbers and at least one range value.

8. A computer system, comprising:

an internal bus;

a plurality of bus devices, each of which couples to said bus, and each of which is capable of running cycles on said bus, and each of said bus devices includes a queue in which operations pending transmission onto said internal bus are stored while the bus device awaits access to the bus;

a bus arbiter coupled to the bus, said bus arbiter receiving request signals from said plurality of bus devices that are seeking to run a cycle on said bus;

wherein any of said devices that include one or more operations in its queue transmits the request signal to said bus arbiter requesting access to said bus and indicating a number of operations pending in its associated queue;

and wherein said bus arbiter resolves conflicting requests from said bus devices based on the number of operations pending in the queues of the requesting devices.

9. The system of claim 8, wherein each of said plurality of bus devices is capable of running bus cycles on said bus as a master device.

10. The system of claim 8, wherein the request signal comprises a sideband signal between the bus devices and the bus arbiter.

11. The system of claim 10, wherein the queue associated with each bus device has the same number of entries.

12. The system of claim 10, wherein at least two of said bus devices have queues with a different number of entries.

13. A method of resolving conflicting bus access requests in an internal computer bus, comprising the acts of:

determining if more than one bus device has requested access to the internal computer bus;

determining workload associated with each bus device requesting access to the internal computer bus; and granting access to the bus device that has the greatest workload;

and wherein the act of determining the workload associated with each bus device includes receiving a signal from each device indicating a number of operations awaiting transmission onto said bus.

14. The method of claim 13, wherein the act of determining if more than one bus device has requested access includes monitoring for a request signal from each of the bus devices capable of initiating cycles on the computer bus.

15. The method of claim 13, wherein the number of operations awaiting execution is determined based on the number of operations pending in a queue in that device.

16. The system of claim 13, further comprising an act of breaking any ties between devices with equal workloads based on other priority criteria.

* * * * *